United States Patent
Brandt et al.

(10) Patent No.: US 10,628,076 B1
(45) Date of Patent: Apr. 21, 2020

(54) DATA ERASURE IN MEMORY SUB-SYSTEMS

(71) Applicant: Micron Technology, Inc., Boise, ID (US)

(72) Inventors: Kevin R Brandt, Boise, ID (US); Thomas Cougar Van Eaton, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/148,564

(22) Filed: Oct. 1, 2018

(51) Int. Cl.
*G06F 3/06* (2006.01)
*H04L 9/08* (2006.01)

(52) U.S. Cl.
CPC ............ *G06F 3/0652* (2013.01); *G06F 3/064* (2013.01); *G06F 3/0608* (2013.01); *G06F 3/0688* (2013.01); *H04L 9/0891* (2013.01)

(58) Field of Classification Search
None
See application file for complete search history.

(56) References Cited

U.S. PATENT DOCUMENTS

| | | | |
|---|---|---|---|
| 9,996,458 B1 | 6/2018 | Mu et al. | |
| 10,403,379 B1* | 9/2019 | Kuo | G11C 16/3445 |
| 2001/0011318 A1* | 8/2001 | Dalvi | G06F 12/1433 |
| | | | 711/103 |
| 2004/0188710 A1* | 9/2004 | Koren | G11C 16/102 |
| | | | 257/197 |
| 2010/0110796 A1* | 5/2010 | Park | G11C 16/16 |
| | | | 365/185.19 |
| 2010/0332923 A1 | 12/2010 | D'abreu et al. | |
| 2011/0238898 A1* | 9/2011 | Honda | G06F 11/1068 |
| | | | 711/103 |
| 2013/0246688 A1 | 9/2013 | Kanno et al. | |
| 2015/0169462 A1* | 6/2015 | Vaisanen | G06F 21/78 |
| | | | 711/166 |
| 2018/0196743 A1 | 7/2018 | Mcvay et al. | |
| 2019/0333586 A1* | 10/2019 | Park | G06F 3/0679 |

FOREIGN PATENT DOCUMENTS

KR 20160016481 2/2016

OTHER PUBLICATIONS

"International Application Serial No. PCT US2019 053590, International Search Report dated Jan. 16, 2020", 3 pgs.
"International Application Serial No. PCT US2019 053590, Written Opinion dated Jan. 16, 2020", 6 pgs.

* cited by examiner

*Primary Examiner* — Kevin Verbrugge
(74) *Attorney, Agent, or Firm* — Schwegman Lundberg & Woessner, P.A.

(57) ABSTRACT

Various examples are directed to memory systems comprising a component and a processing device. The memory system may comprise a plurality of blocks. A first portion of the plurality of blocks may be retired and a second portion of the plurality of blocks may be unretired. The processing device receives a sanitize operation for the plurality of blocks. The processing device initiates a first erase cycle at a first retired block of the plurality of blocks. The processing device determines that the first erase cycle was not successful and sets an erase indicator to false.

20 Claims, 6 Drawing Sheets

DATA ERASURE IN MEMORY SUB-SYSTEMS

TECHNICAL FIELD

The present disclosure generally relates to memory sub-systems, and more specifically, relates to data erasure in memory sub-systems.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to a memory sub-system with erasure verification. A memory sub-system is also hereinafter referred to as a "memory system." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. Different memory components can include different types of media. Examples of media include, but are not limited to, a cross-point array of non-volatile memory and flash-based memory cells. In many memory sub-systems, there is a distinction between deleting memory cells and sanitizing memory cells. A delete operation involves indicating at a controller of the memory sub-system and/or an operating system of a host machine that the affected memory cells are no longer in use. A delete operation does not include immediately erasing data stored at the memory cells. Deleted memory cells may be later erased and configured for re-use by periodic garbage collection operations. In garbage collection operations, memory cells including data that is no longer needed (e.g., deleted) are identified and erased. When it is desirable to erase data, a sanitize operation is executed. During a sanitize operation, the memory sub-system erases data at the indicated memory cells, for example, by changing the programmed state of some or all of the memory cells.

In many memory components, including those that include flash memory cells, a block or blocks of memory cells can be retired, for example, if the block fails to operate correctly. For example, a block can be retired if it one or more pages at the block cannot be correctly written or read. Also, in some examples, a block can be retired if the block cannot be successfully erased. When a block is retired, it is no longer used to store data In different memory sub-systems, retired blocks are handled in different ways during delete and sanitize operations. For example, when a retired block is deleted, the block is indicated to be no longer in use. In some examples, when a retired block is deleted, garbage collection operations do not erase and configure the block for re-use as it does other blocks. For example, retired blocks may not be included in the garbage collection operation and may remain unused. Similarly, during a sanitize operation, retired blocks may be erased without being configured for re-use.

In conventional arrangements, however, a sanitize command does not provide an indication of whether blocks, including retired blocks, were successfully erased. Accordingly, the successful completion of a sanitize command may not provide an indication that all data at the relevant block or blocks has been erased. Consider an example block that was retired for failure to properly erase. The block may have been retired because a previous erase cycle at the block failed to complete within a threshold time. This is also referred to as timing out. During a sanitize operation, the retired block is subjected to an additional erase cycle. The additional erase cycle may be successful or unsuccessful, for example, depending on the reasons that the first erase cycle timed out. If the additional erase cycle fails, then data may be stored at the retired block, and potentially recoverable, despite the sanitize operation.

Aspects of the present disclosure address the above and other deficiencies by tracking the success or failure of the erase cycles at blocks of a memory component during a sanitize operation and generating an indication of whether any erase cycles were unsuccessful. The indication may include an erase indicator. If an erase cycle during the sanitize operation fails, the erase indicator is set to false. If all erase cycles during the sanitize operation are successful, the erase indicator is set to true. Any suitable erase indicator value can be selected to correspond to true or false. The value of the erase indicator corresponding to true is any value indicating that all erase cycles dining the sanitize operation were successful. The value of the erase indicator corresponding to false is any value indicating that not all of the erase cycles during the sanitize operation were successful. For example, in some implementations, the erase indicator value corresponding to true can be logic "1" while the erase indicator value corresponding to false is logic "0." In other implementations, the erase indicator value corresponding to true can be logic "0" while the erase indicator value corresponding to false is logic "1." In other examples, the erase indicator values can include more than one bit. The erase indicator values for true and false are different from one another. For example, the erase indicator value for true is not equal to the erase indicator value for false.

The memory component, in some examples, provides a status indicator after an erase cycle is performed at a block. The status indicator provides an indication of whether the erase cycle was successful or unsuccessful. In some examples, in addition to or instead of relying on a status indicator provided by a memory component, the memory sub-system attempts read operations at some or all of the blocks that are the subject of the sanitize operation after erase cycles are executed. Attempting a read operation at a block can include attempting a read operation and some or all of the pages or other sub-components included at the block. If a read operation is successful, then the block is not successfully erased and the erase indicator is set to false. In some examples, the status indicator after an erase cycle is set based on an erase verify operation that can check that the pages of erased blocks are erased by reading groups of pages in a single operation or set of operations.

Figure 1:
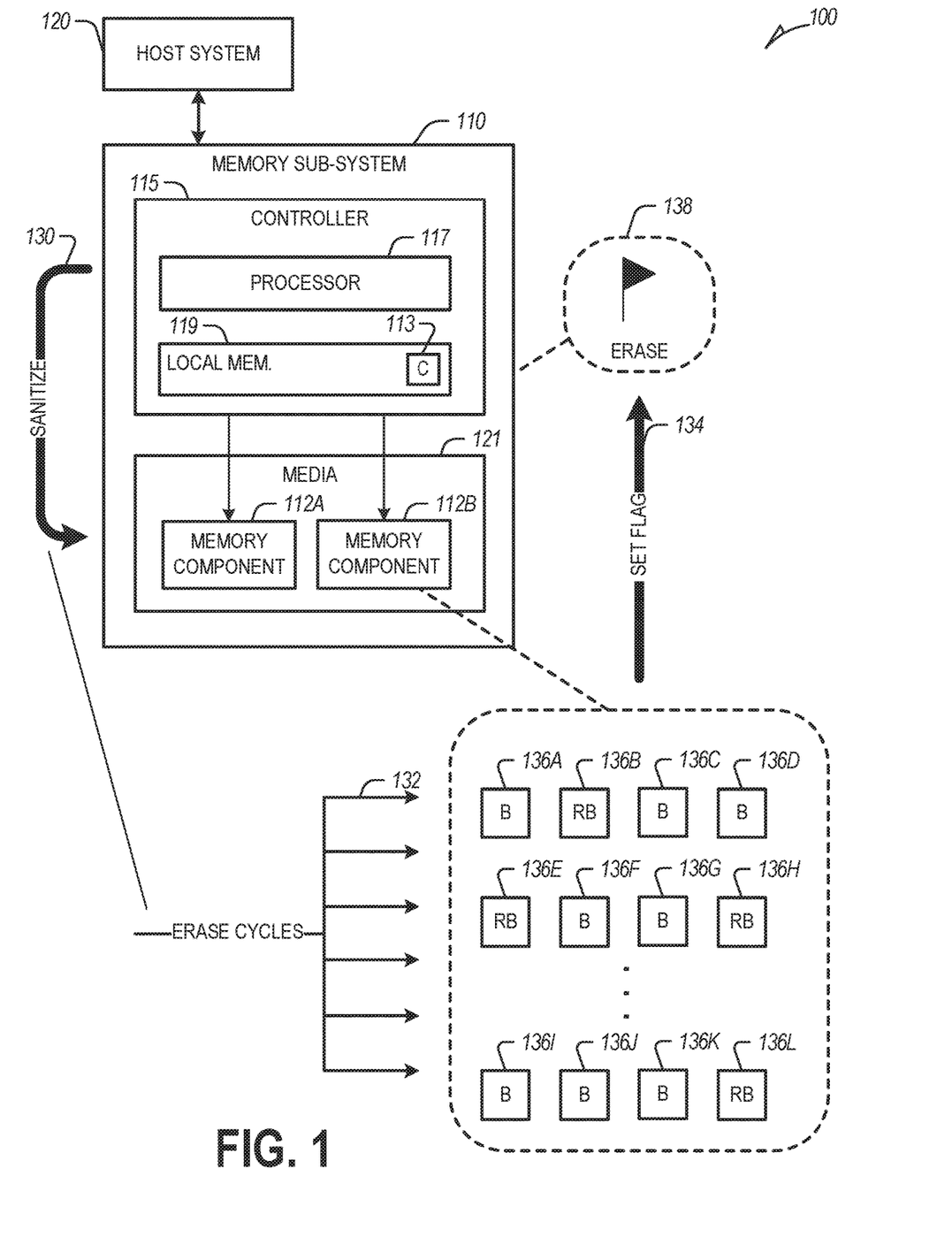
FIG. 1 illustrates an example computing environment that includes a memory sub-system in accordance with some embodiments of the present disclosure.

FIG. 1 illustrates an example: computing environment 100 that includes a memory sub-system 110 in accordance with some embodiments of the present disclosure. The memory sub-system 110 can include media 121, such as memory components 112A to 112N. The memory components 112A to 112N can be volatile memory components, non-volatile memory, components, or a combination of such. In some embodiments, the memory sub-system 110 is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as Single Level Cells (SLCs) or Multilevel Cells (MLCs). (MLCs refer generally to memory cells that store more than one bit of data, including two level cells, triple level cells (TLCs) or quad-level cells (QLCs)). In some embodiments, a particular memory component can include both an SLC portion and a MLC portion of memory cells. Each of the memory cells can store one or more bits of data used by the host system 120 or memory sub-system 110. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose; logic circuitry a field programmable gate array (FPGA), an application specific integrated circuit (ASIC), etc.) or another suitable processor. The controller 115 can include a processor (processing device) 1 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 19 can also include read-only memory (ROM) for storing micro-code.

While the example memory sub-system 110 in FIG. 1 has been illustrated as including the controller 115, in another embodiment of the present disclosure, a memory sub-system 110 may rely upon external control (e.g., provided by an external host, or by a processor or controller separate from the memory sub-system) to perform some or all of the management of the memory sub-system 110. In examples where some or all of the management of the memory sub-system 110 are performed by an external host, the controller 115 may be omitted.

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical address and a physical address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive a logical address from the controller 115 and decode the logical address to one or more physical addresses at the memory components 112A to 112N.

The memory sub-system 110 of FIG. 1 executes an example sanitize operation 130. The sanitize operation 130 is directed to a set of blocks 136A, 136B, 136C, 136D, 136E, 136F, 136G, 136H, 136I, 136J, 136K, 136L. Although twelve blocks are shown, the sanitize operation 130 may be directed to any suitable number of blocks. In some examples, the sanitize operation 130 is directed to all blocks at a memory component 112A, 112E or all blocks in the memory sub-system 110. In the example of FIG. 1, a first portion of the blocks are unretired, including example blocks 136A, 136C, 136D, 136F, 136G, 136I, 136J, 136K. A second portion of the blocks are retired, including example blocks 136B, 136E, 136H, 136L. The retired blocks 136B, 136E, 136H, 136L may have been retired for any suitable reason including, for example, a failure to write, a failure to read, a failure to erase, etc.

The sanitize operation 130 includes erase cycles 132. The erase cycles 132 may include one erase cycle for each block 136A, 136B, 1360, 136D, 136E, 136F, 136G, 136H, 136I, 136J, 136K, 136L of the set of blocks. Based on the results of the erase cycles 132, the memory sub-system 110 sets the erase flag (or other indicator) 138 with a set flag operation 134. For example, if each of the erase cycles 132 were successful, then the erase flag 138 is set to true. If any of the erase cycles 132 were unsuccessful, then the erase flag 138 is set to indicate that the erase was unsuccessful. The erase flag 138 may be available to the host system 120 or other user of the memory sub-system 110 in various ways. For example, the erase flag 138 may be provided to the host system, for example, in response to a status request command. The erase flag 138 may be provided by itself or as part of a status page or word. The status request command may be generic or, in some examples, may be specific to the manufacturer of the memory sub-system 110. Also, in some examples, the erase flag 138 is stored at local memory 119 and/or a memory component 112A, 112B as a log page. The log page may be accessible to the host system 120 and/or the controller 115 with a read request.

In some examples, the sanitize operation 130 includes setting one or more indicators (e.g., s) such as, for example, a retired block erase flag and an unretired block erase flag. The retired block erase flag is set to true if all retired blocks have been successfully erased. The retired block erase flag is set to false if any retired blocks have not been successfully erased. The unretired block erase flag is set to true if all unretired blocks have been successfully erased. The unretired block erase flag is set to false if any unretired blocks have not been successfully erased.

In the example environment 100 of FIG. 1, the local memory 119 of the controller 1155 includes executing the sanitize operation 130. In this example, the sanitize operation 130 is executed by the controller 115. In other examples, some or all of the logic for executing the sanitize operation can be execute at various other locations. In some examples, some or all of the logic for executing the sanitize operation 130 is included as code executed at the host system 120. Also, in some examples, some or all of the logic for executing the sanitize operation 130 is included, for example, as processing logic at one or more of the memory components 112A, 112B.

Figure 2:
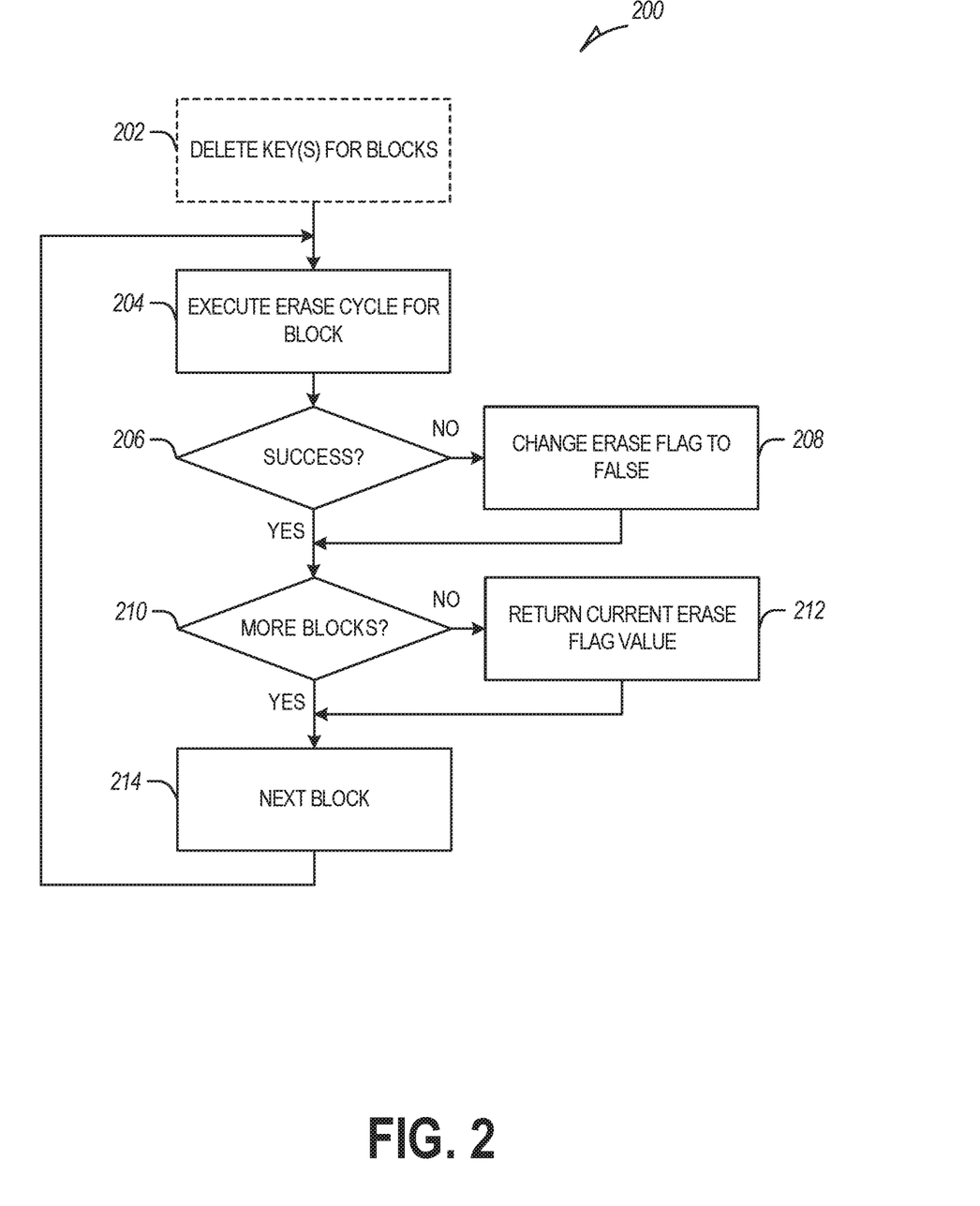
FIG. 2 is a flow diagram of an example method to execute a sanitize operation, such as the sanitize operation of FIG. 1, in accordance with some embodiments of the present disclosure.

FIG. 2 is a flow diagram of an example method 200 to execute a sanitize operation, such as the sanitize operation 130 of FIG. 1, in accordance with some embodiments of the present disclosure. The sanitize operation is directed to one or more blocks at a memory component or memory components. In some examples, the sanitize operation is directed to all the blocks at a memory component and/or all the blocks at a memory media. Memory blocks to which the sanitize operation is directed are referred to as blocks within the scope of the sanitize operation. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At optional operation 202, the processing logic deletes one or more cryptographic keys corresponding to the blocks within the scope of the sanitize operation. For example, data at some or all the blocks within the scope of the sanitize operation may be encrypted by the memory sub-system. When data at a block is encrypted by the memory sub-system, the memory sub-system manages cryptographic keys to encrypt and decrypt the data. For example, when the memory sub-system receives write request including a data unit, it generates and/or retrieves a cryptographic key. The memory sub-system uses the cryptographic key to encrypt the data unit, resulting in an encrypted data unit. The cryptographic key is stored at the local memory of the controller, at a memory component, or at another suitable location at the memory sub-system 110. The same cryptographic key may be used for multiple blocks or, in some examples, different cryptographic keys are used for different blocks. The encrypted data unit is written to a block at a memory component. Upon receiving a read request for the data unit, the memory sub-system retrieves the appropriate cryptographic key and decrypts the encrypted data unit. The decrypted data unit is then returned in response to the read request. For blocks that utilize encryption, deleting the cryptographic key or keys that correspond to the blocks within the scope of the sanitize operation increases the difficulty of recovering data from the blocks after the sanitize operation, even if the blocks are not successfully erased.

At operation 204, the processing logic initiates an erase cycle for a first block within the scope of the sanitize operation. The erase cycle may be executed in any suitable manner. For example, the host device and/or controller may send to the memory component including the block an erase command that causes the memory component to execute an erase cycle for the block. In some examples, the first block comprises NAND memory cells. The NAND memory cells of the block may be erased by holding the sources of the respective memory cells to ground and raising the control gates to an erase voltage for a cycle time. After the cycle time, the memory component including the block returns an indication that the erase cycle was successful or unsuccessful.

At operation 206, the processing logic determines if the erase cycle for the block was successful. If the erase cycle was not successful, the processing logic changes the erase flag to false at operation 208, indicating that not all blocks have been successfully erased. If the erase cycle was successful, the processing logic determines at operation 210 whether there are additional blocks in the scope of the sanitize operation that have not been subjected to an erase cycle. If no blocks remain, the processing logic returns the current erase flag value at operation 212. If blocks do remain, then processing logic moves to the next block at operation 214 and returns to operation 204 to execute an erase cycle at the next block.

Figure 3:
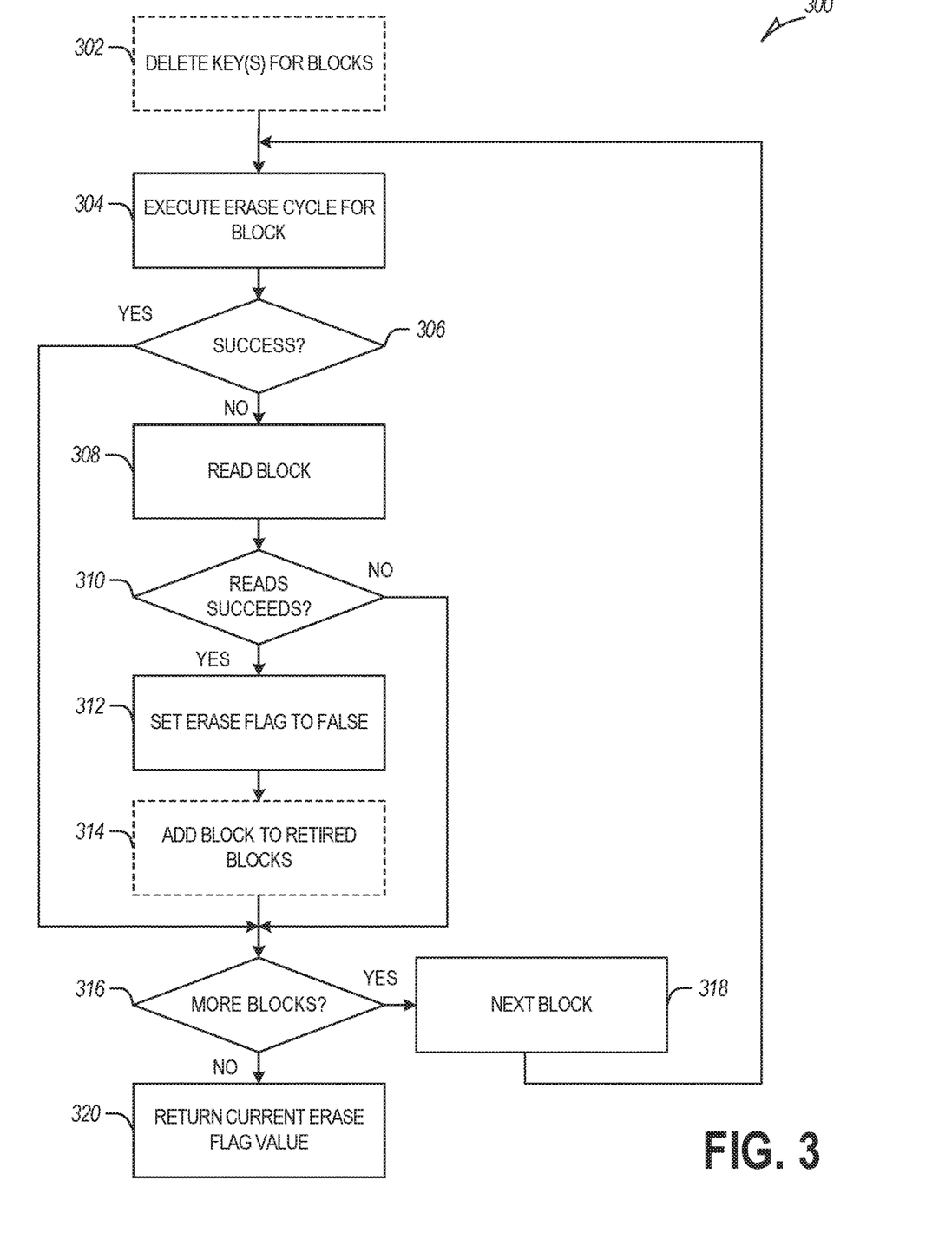
FIG. 3 is a flow diagram of another example method to execute a sanitize operation, such as the sanitize operation of FIG. 1, in accordance with some embodiments of the present disclosure.

FIG. 3 is a flow diagram of another example method 300 to execute a sanitize operation, such as the sanitize operation 130 of FIG. 1, in accordance with some embodiments of the present disclosure. The sanitize operation is directed to one or more blocks at a memory component or memory components. In some examples, the sanitize operation is directed to all the blocks at a memory component and/or all the blocks at a memory media. Memory blocks to which the sanitize operation is directed are referred to as blocks within the scope of the sanitize operation. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At optional operation 302, the processing logic deletes one or more cryptographic keys for blocks within the scope of the sanitize operation, for example, similar to operation 202 above. At operation 304, the processing logic executes an erase cycle for a first block within the scope of the sanitize operation. At operation 306, the processing logic determines if the erase cycle was successful.

If the erase cycle is unsuccessful, the processing logic attempts to read the block at operation 308. For example, in some situations, a block may be unreadable after an erase operation even if the erase operation failed. The read at operation 308 checks whether the block is unreadable despite the failure of the erase cycle at operation 304. When the block includes NAND flash memory cells, the block may be readable by page, where there are multiple pages in the block. The reading of the block at operation 308 may include reading each page of the block. In some examples, the reading of the block at operation 308 includes reading less than all the pages of the block (e.g., every other page, every third page, etc.) or executing an operation that reads multiple pages simultaneously.

The processing logic determines if the read was successful at operation 310. The ad is successful, for example, if the read produces a data unit without bit errors, for example, as determined by Error Correction Code (ECC) or other suitable technique. The read may be considered successful if any of the pages of the block are successfully read. In some examples, the read is considered successful if less than a threshold number of pages of the block are successfully read. If the read is unsuccessful, it indicates that the block is effectively erased. Accordingly, if the read is unsuccessful, the processing logic proceeds to the next block at operation 316 without setting the erase flag to false. If the read is successful, the processing logic sets the erase flag to false at operation 312. At optional operation 314, the processing logic retires the block, for example, by storing an indication of the block to a retired blocks list.

At operation 316, the processing logic determines if there are additional blocks within the scope of the sanitize operation. If yes, then the processing logic proceeds to the next block at operation 318 and returns to operation 304 to execute an erase cycle at that block. If there are no more blocks within the scope of the sanitize operation, the processing logic returns the current erase flag value at operation 320.

Figure 4:
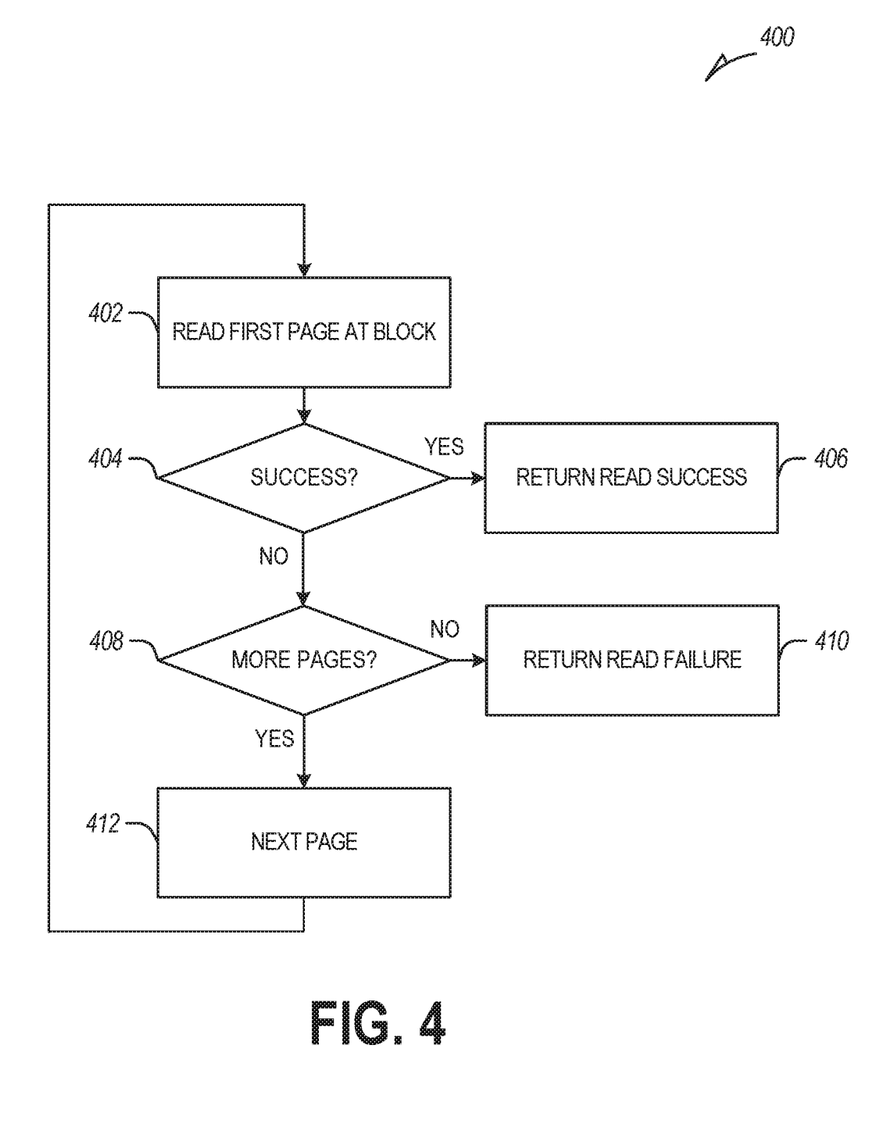
FIG. 4 is a flow diagram of an example method to read a block for which an erase cycle has failed, in accordance with some embodiments of the present disclosure.

FIG. 4 is a flow diagram of an example method 400 to read a block for which an erase cycle has failed, in accordance with some embodiments of the present disclosure. The method 400 is one example way that the process logic can execute the operation 308 of the method 300 described herein. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic reads a first page at the block. At operation 404, the processing logic determines if the read was a success, for example, based on an ECC or other method. If the read is a success, then the processing logic returns an indication that the read was successful at operation 406. If the read was not successful, the processing logic determines at operation 408 whether there are additional pages at the block to be read at operation 408. This may include determining whether there are any pages at the block that have not been read yet. If there are no more pages, the processing logic returns a read failure at operation 410 indicating that the block was not successfully read. If there are remaining pages, the processing logic proceeds to the next page at operation 412 and reads the next page at operation 402.

Figure 5:
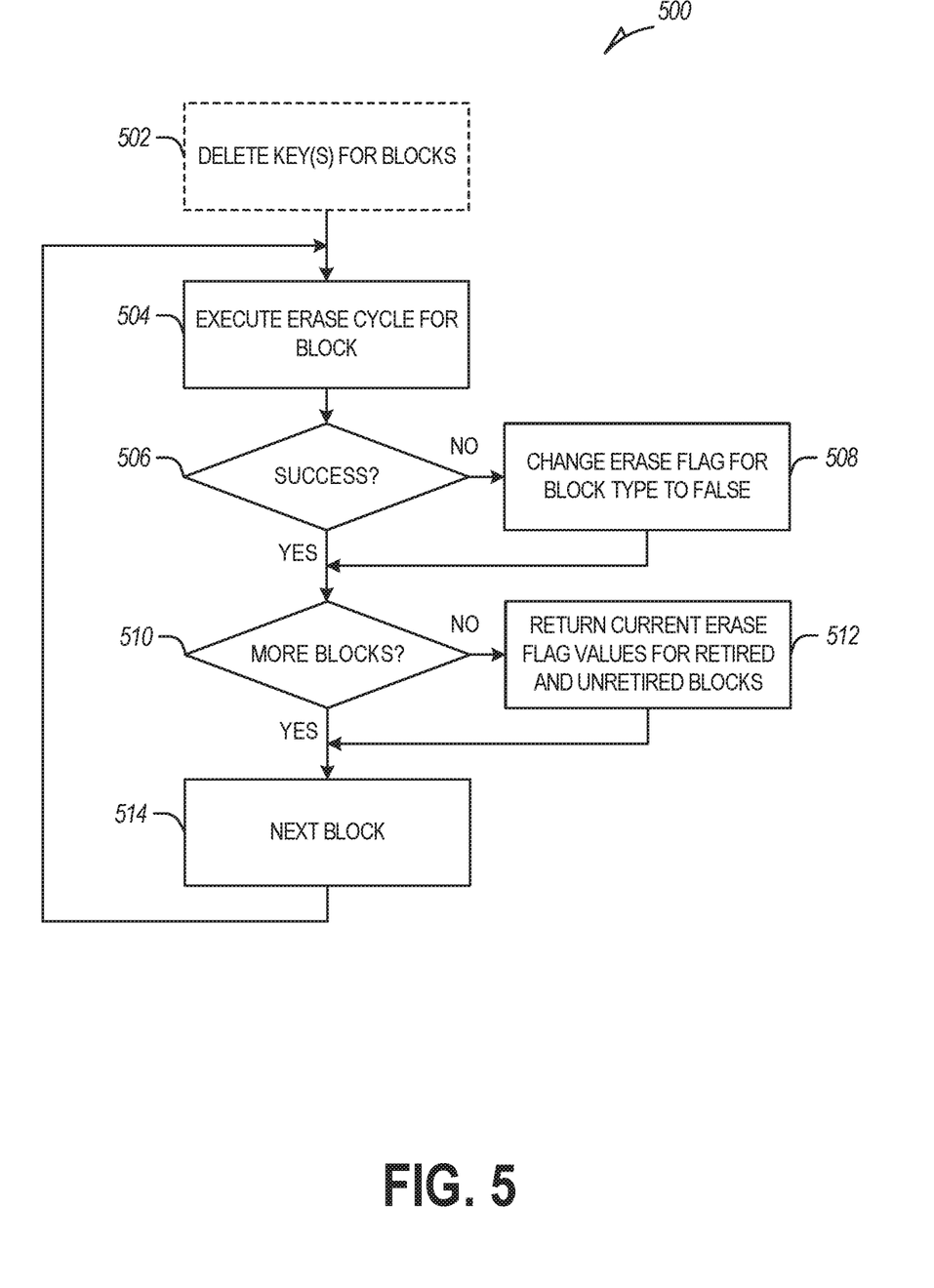
FIG. 5 is a flow diagram of another example method to execute a sanitize operation, such as the sanitize operation of FIG. 1, in accordance with some embodiments of the present disclosure.

FIG. 5 is a flow diagram of another example method 500 to execute a sanitize operation, such as the sanitize operation 130 of FIG. 1, in accordance with some embodiments of the present disclosure. The sanitize operation is directed to one or more blocks at a memory component or memory components. In some examples, the sanitize operation is directed to all the blocks at a memory component and/or all the blocks at a memory media. Memory blocks to which the sanitize operation is directed are referred to as blocks within the scope of the sanitize operation. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 500 shows an example where the processing logic maintains two erase flags. An unretired block erase flag corresponds to blocks that were unretired at the outset of the sanitize operation and a retired block erase flag corresponds to retired blocks. At optional operation 502, the processing logic deletes one or more cryptographic keys corresponding to the blocks within the scope of the sanitize operation. At operation 504, the processing logic initiates an erase cycle for a first block within the scope of the sanitize operation. At operation 506, the processing logic determines if the erase cycle for the block was successful.

If the erase cycle was not successful, the processing logic changes the erase flag corresponding to the type of the block to false at operation 508, indicating that not all blocks of that type have been successfully erased. For example, if the block was previously retired, the processing logic changes the retired block erase flag to false. If the block was previously un-retired, the processing logic changes the unretired block erase flag to false. (In some examples, the processing logic reads the block before setting the appropriate flag to false, for example, as described herein with respect to FIGS. 3 and 4.

If the erase cycle was successful, the processing logic determines at operation 510 whether there are additional blocks in the scope of the sanitize operation that have not been subjected to an erase cycle. If no blocks remain, the processing logic returns the current retired block erase flag value and unretired block erase flag value at operation 512. If blocks do remain, then processing logic moves to the next block at operation 514 and returns to operation 504 to execute an erase cycle at the next block.

Figure 6:
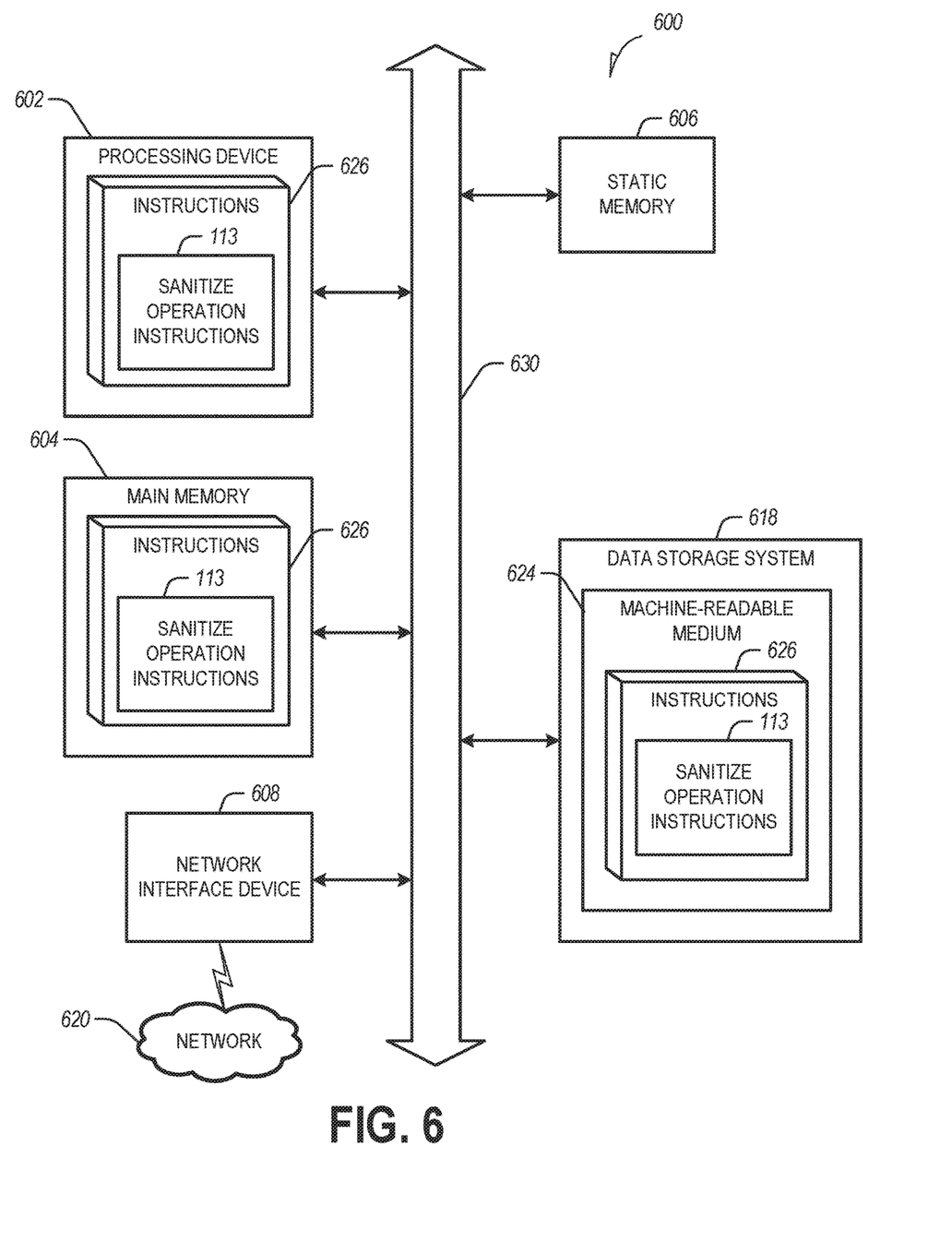
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to execute instructions 113 for executing a sanitize operation. In alternative embodiments, the machine can be connected (e networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or, jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a non-transitory machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include the instructions 113 to implement functionality corresponding to the sanitize operation, as described herein. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate; physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
   a memory component comprising a plurality of blocks; and
   a processing device programmed to perform operations comprising:
      receiving a sanitize command for the plurality of blocks, wherein a first portion of the plurality of blocks are retired and a second portion of the plurality of blocks are unretired;
      initiating a first erase cycle at a first retired block of the plurality of blocks;
      determining that the first erase cycle was successful;
      initiating a second erase cycle at a second retired block of the plurality of blocks;
      determining that the second erase cycle was not successful; and
      setting an erase indicator to false.

2. The memory system of claim 1, wherein the processing device is further programmed to perform operations comprising deleting at least one cryptographic key for decrypting data stored at the first retired block.

3. The memory system of claim 1, wherein the processing device is further programmed to perform operations comprising:
   sending to the memory component a first erase command directed to the first retired block;
   receiving, from the memory component, a status indicator indicating that the first erase command was unsuccessful.

4. The memory system of claim 1, wherein the processing device is further programmed to perform operations comprising:
   determining that all the blocks of the second portion are erased; and
   setting an unretired block erase indicator to true.

5. The memory system of claim 1, wherein the processing device is further programmed to perform operations comprising:
   reading the first retired block; and
   determining that the reading of the first retired block was successful.

6. The memory system of claim 1, further comprising storing to the memory system an indication that the first retired block is retired.

7. The memory system f claim 1, wherein the processing device is further programmed to perform operations comprising:
   determining that a third block of the plurality of blocks failed to erase;
   reading the third block; and
   determining that the reading of the third block was unsuccessful.

8. The memory system of claim 1, wherein the processing device is further programmed to perform operations comprising:
   receiving, from a host device, a request to read the erase indicator; and
   sending, to the host device, an indication of the erase indicator.

9. A method comprising:
receiving a sanitize operation for a plurality of blocks, wherein a first portion of the plurality of blocks are retired and a second portion of the plurality of blocks are unretired;
initiating a first erase cycle at a first retired block of the plurality of blocks;
determining that the first erase cycle was successful;
initiating a second erase cycle at a second retired block of the plurality of blocks;
determining that the second erase cycle was not successful; and
setting an erase indicator to false.

10. The method of claim 9, further comprising deleting at least one cryptographic key for decrypting data stored at the first retired block.

11. The method of claim 9, further comprising:
sending to a memory component comprising the first retired block a first erase command directed to the first retired block; and
receiving, from the memory system, a status indicator indicating that the first erase command was unsuccessful.

12. The method of claim 9, further determining that all the blocks of the second portion are erased; and
setting an unretired block erase indicator to true.

13. The method of claim 9, further comprising:
reading the first retired block; and
determining that the reading of the first retired block was successful.

14. The method of claim 9, further comprising storing to the memory system an indication that the first retired block is retired.

15. The method of claim 9, further comprising:
determining that a second block of the plurality of blocks failed to erase;
reading the second block; and
determining that the reading of the second block was unsuccessful.

16. The method of claim 9, further comprising:
receiving, from a host device, a request to read the erase indicator; and
sending, to the host device, an indication of the erase indicator.

17. A non-transitory machine-readable storage medium comprising instructions that, when executed by a processing device, cause the processing device to perform operations comprising:
receiving a sanitize operation for a plurality of blocks, wherein a first portion of the plurality of blocks are retired and a second portion of the plurality of blocks are unretired;
initiating a first erase cycle at a first retired block of the plurality of blocks;
determining that the first erase cycle was successful;
initiating a second erase cycle at a second retired block of the plurality of blocks;
determining that the second erase cycle was not successful; and
setting an erase indicator to false.

18. The non-transitory machine-readable storage medium of claim 17, further comprising instructions that, when executed by the processing device, cause the processing device to perform operations comprising deleting at least one cryptographic key for decrypting data stored at the first retired block.

19. The non-transitory machine-readable storage medium of claim 17, further comprising instructions that, when executed by the processing device, cause the processing device to perform operations comprising:
sending to a memory component comprising the first retired block a first erase command directed to the first retired block; and
receiving, from the memory component, a status indicator indicating that the first erase command was unsuccessful.

20. The non-transitory machine-readable storage medium of claim 17, further comprising instructions that, when executed by the processing device, cause the processing device to perform operations comprising:
determining that all the blocks of the second portion are erased; and
setting an unretired block erase indicator to true.

* * * * *